United States Patent
Kwak et al.

(10) Patent No.: US 11,475,312 B2
(45) Date of Patent: Oct. 18, 2022

(54) METHOD AND APPARATUS WITH DEEP NEURAL NETWORK MODEL FUSING

(71) Applicant: Samsung Electronics Co., Ltd., Suwon-si (KR)

(72) Inventors: Youngjun Kwak, Seoul (KR); Youngsung Kim, Suwon-si (KR); Byung In Yoo, Seoul (KR); Yong-Il Lee, Daejeon (KR); Hana Lee, Suwon-si (KR); Sangil Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 16/902,299

(22) Filed: Jun. 16, 2020

(65) Prior Publication Data

US 2021/0150367 A1    May 20, 2021

(30) Foreign Application Priority Data

Nov. 18, 2019 (KR) .................. 10-2019-0147821

(51) Int. Cl.
*G06N 3/08* (2006.01)
*G06N 3/04* (2006.01)

(52) U.S. Cl.
CPC ........... *G06N 3/084* (2013.01); *G06N 3/0454* (2013.01)

(58) Field of Classification Search
CPC .... G06N 3/084; G06N 3/0454; G06N 3/0472; G06N 3/0481; G06N 3/088; G06N 3/08; G06N 3/04
See application file for complete search history.

(56) References Cited

U.S. PATENT DOCUMENTS

| | | |
|---|---|---|
| 2005/0278322 A1 | 12/2005 | Fan et al. |
| 2016/0078339 A1 | 3/2016 | Li et al. |
| 2016/0171974 A1 | 6/2016 | Hannun et al. |
| 2017/0039456 A1 | 2/2017 | Saberian et al. |
| 2018/0018757 A1 | 1/2018 | Suzuki |
| 2018/0034842 A1 | 2/2018 | Smyth et al. |
| 2018/0150728 A1 | 5/2018 | Vahdat |

(Continued)

FOREIGN PATENT DOCUMENTS

| | | |
|---|---|---|
| JP | 2009-282686 A | 12/2009 |
| KR | 2003-0071939 A | 9/2003 |

(Continued)

OTHER PUBLICATIONS

Potdevin, et al. "An Empirical Investigation of Randomized Defenses Against Adversarial Attacks." Kiel University, Germany, Waterloo University, Canada (Sep. 12, 2019). (21 Pages in English).

(Continued)

*Primary Examiner* — Maurice L. McDowell, Jr.
(74) *Attorney, Agent, or Firm* — NSIP Law

(57) ABSTRACT

A processor-implemented method including implementing a deep neural network (DNN) model using input data, generating, by implementing the DNN model, first output data from the DNN model, changing the DNN model, generating, by implementing the changed DNN model using the input data, second output data of the changed DNN model, and determining result data by combining the first output data and the second output data.

24 Claims, 7 Drawing Sheets

(56) References Cited

U.S. PATENT DOCUMENTS

| | | | |
|---|---|---|---|
| 2018/0197049 A1* | 7/2018 | Tran | G06N 3/08 |
| 2018/0276454 A1* | 9/2018 | Han | G06V 40/171 |
| 2018/0285731 A1* | 10/2018 | Heifets | G16C 20/70 |
| 2019/0138896 A1 | 5/2019 | Deng | |
| 2019/0156183 A1* | 5/2019 | Durham | G06N 3/0472 |
| 2019/0197395 A1 | 6/2019 | Kibune et al. | |
| 2019/0220605 A1 | 7/2019 | Kounavis et al. | |

FOREIGN PATENT DOCUMENTS

| | | | | |
|---|---|---|---|---|
| KR | 10-1828503 B1 | 3/2018 | | |
| KR | 10-1916348 B1 | 11/2018 | | |
| KR | 10-2019-0001278 A | 1/2019 | | |
| KR | 10-2002732 B1 | 7/2019 | | |
| WO | WO-2019207581 A1 * | 10/2019 | | G06K 9/6218 |

OTHER PUBLICATIONS

Extended European Search Report dated Apr. 16, 2021 in counterpart European Patent Application No. 20204519.1 (7 pages in English).

Baskin, Chaim et al., "UNIQ: Uniform Noise Injection for Non-Uniform Quantization of Neural Networks", *arXiv preprint arXiv*, 2018 (pp. 1-10).

He, Zhezhi et al., "Parametric Noise Injection: Trainable Randomness to Improve Deep Neural Network Robustness against Adversarial Attack", *In Proceedings of the IEEE Conference on Computer Vision and Pattern Recognition*, 2019 (pp. 588-597).

* cited by examiner

METHOD AND APPARATUS WITH DEEP NEURAL NETWORK MODEL FUSING

CROSS-REFERENCE TO RELATED APPLICATIONS

This application claims the benefit under 35 USC § 119(a) of Korean Patent Application No. 10-2019-0147821, filed on Nov. 18, 2019, in the Korean Intellectual Property Office, the entire disclosure of which is incorporated herein by reference for all purposes.

BACKGROUND

1. Field

The following description relates to a data processing method and apparatus with a neural network model.

2. Description of Related Art

A neural network is a processor-implemented computing system which is implemented by referring to a computational architecture. Neural networks have an operation structure in which a large number of processing devices that implement simple functions may be connected in parallel, and are widely used as a new technique to address issues that may have been difficult to solve by implementing typical techniques. The neural network may have a generalization ability to generate a relatively correct output for an input pattern that has not be used for training, based on a result of training.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented method includes implementing a deep neural network (DNN) model using input data, generating, by implementing the DNN model, first output data from the DNN model, changing the DNN model, generating, by implementing the changed DNN model using the input data, second output data of the changed DNN model; and determining result data by combining the first output data and the second output data. The input data may be inference input data.

The changing of the DNN model may include changing at least one connection weight of the DNN model.

The changing of the DNN model may include determining a noise value based on a noise model; and applying the determined noise value to at least one connection weight of the DNN model.

The determining of the noise value may include determining the noise value a Gaussian model.

The noise value may be a quantized noise value.

The DNN model may be a single DNN model.

The DNN model may be one of a face authentication model, a liveness model, a translation model, and an objection recognition model, and an object detection model.

In a general aspect, a processor-implemented data processing method includes generating a first changed deep neural network (DNN) model by changing a trained initial DNN model, generating first output data from the first changed DNN model by implementing the first changed DNN model using input data, generating a second changed DNN model by changing the initial DNN model, generating second output data from the second changed DNN model by implementing the second changes DNN model using the input data; and determining result data by combining the first output data and the second output data.

The generating of the first changed DNN model may include changing at least one connection weight of the initial DNN model, the generating of the second changed DNN model comprises changing at least one connection weight of the initial DNN model, and the first changed DNN model is different from the second changed DNN model.

The method may include determining the result data based on an output of the initial DNN model.

In a general aspect, a processor-implemented training method includes changing a deep neural network (DNN) model, implementing the changed DNN model using trained input data, generating, by implementing the changed DNN model, output data from the changed DNN model, updating parameters of the DNN model based on the generated output data; and training the DNN model by repeatedly performing the changing, the generating, and the updating.

The changing of the DNN model may include changing at least one connection weight of the DNN model.

The changing of the DNN model may include determining a noise value based on a noise model; and applying the determined noise value to at least one connection weight of the DNN model.

The noise value may be a quantized noise value.

The generating of the output data may include generating the output data by inputting training data containing noise to the changed DNN model.

In a general aspect, an apparatus includes one or more processors configured to implement a deep neural network (DNN) model using input data, generate, by implementing the DNN model, first output data of the DNN model, change the DNN model, generate, by implementing the changed DNN model using the input data, second output data from the changed DNN model; and determine result data by combining the first output data and the second output data.

The processor may be further configured to change at least one connection weight of the DNN model.

The processor may be further configured to determine a noise value based on a noise model and apply the determined noise value to the at least one connection weight of the DNN model, to change the at least one connection weight of the DNN model.

The apparatus may include a memory storing instructions that, when executed by the one or more processors, configure the one or more processors to perform the generating of the first output data, the changing of the DNN model, the generating of the second output data, and the determining of the result data.

The apparatus may include an image capture device configured to capture the input data.

In a general aspect, an apparatus includes one or more processors configured to generate a first changed deep neural network (DNN) model by changing a trained initial DNN model, generate first output data of the first changed DNN model by implementing the first changed DNN model using input data, generate a second changed DNN model by changing the initial DNN model, generate second output data from the second changed DNN model by implementing the second changes DNN model using the input data; and determine result data by combining the first output data and the second output data.

The processor may be further configured to generate the first changed DNN model by changing at least one connection weight of the DNN model; and generate the second changed DNN model by changing at least one connection weight of the DNN model, and wherein the first changed DNN model is different from the second changed DNN model.

The apparatus may include a memory storing instructions that, when executed by the one or more processors, configure the one or more processors to perform the generating of the first changed DNN model, the generating of the first output data, generating of the second changed DNN model, the generating of the second output data, and the determining of the result data.

The apparatus may include an image capture device configured to capture the input data.

In a general aspect, a processor-implemented method includes implementing an initial neural network model with input data, implementing a first changed neural network model by applying a first quantized noise value to connection weights of the initial neural network, inputting the input data to the first changed neural network model, generating first output data from the first changed neural network model, applying second quantized noise values to the first changed neural network model to obtain a second changed neural network model, inputting the input data to the second changed neural network model, generating second output data from the second changed neural network model, generating fused output data based on the first output data and the second output data, and generating a final output result from the fused data.

The neural network model may be a deep neural network model.

The first changed neural network model may be different from the second changed neural network model.

The first noise value may be different from the second noise value.

Other features and aspects will be apparent from the following detailed description, the drawings, and the claims.

Figure 1:
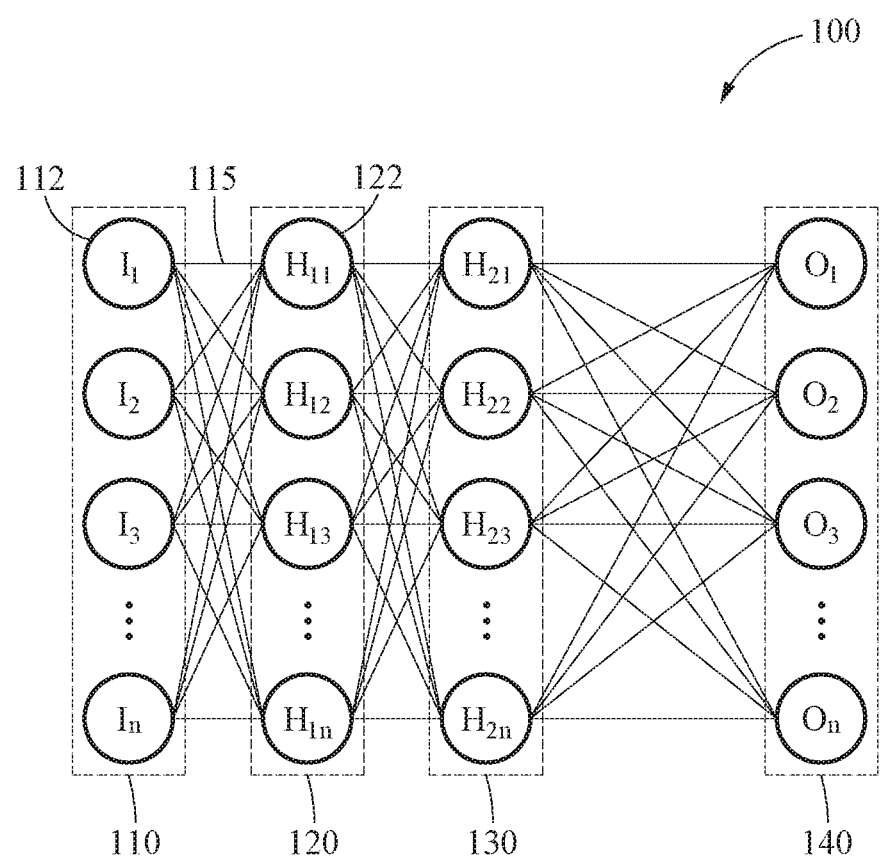
FIG. 1 illustrates an example of a deep neural network (DNN) model, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of the application, may be omitted for increased clarity and conciseness.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains after an understanding of the disclosure of this application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

FIG. 1 illustrates an example of a deep neural network (DNN) model 100. Technological automation of pattern recognition or analyses, for example, has been implemented through processor implemented neural network models, as specialized computational architectures, that after substantial training may provide computationally intuitive mappings between input patterns and output patterns or pattern recognitions of input patterns. The trained capability of generating such mappings or performing such pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

Referring to FIG. 1, the DNN model 100 may include a plurality of layers. For example, the DNN model 100 may include an input layer 110, a plurality of hidden layers 120 and 130, and an output layer 140. Each of the layers includes a plurality of nodes (or neurons). Each node is a unit of calculation with an input and an output, and nodes are connected to each other. Briefly, such reference to "neurons" is not intended to impart any relatedness with respect to how the neural network architecture computationally maps or thereby intuitively recognizes information, and how a human's neurons operate. In other words, the term "neuron" is merely a term of art referring to the hardware implemented nodes of a neural network, and will have a same meaning as a node of the neural network.

In an example, the DNN may be one or more of a fully connected network, a convolution neural network, a recurrent neural network, and the like, or may include different or overlapping neural network portions respectively with such full, convolutional, or recurrent connections, according to an algorithm used to process information. The neural network 100 may be configured to perform, as non-limiting examples, object classification, object recognition, voice recognition, and image recognition by mutually mapping input data and output data in a nonlinear relationship based on deep learning. Such deep learning is indicative of processor implemented machine learning schemes for solving issues, such as issues related to automated image or speech recognition from a data set, as non-limiting examples. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Referring to FIG. 1, the input layer 110 may include one or more nodes, for example, nodes $I_1$ through $I_n$, to which data is directly input instead of passing through a link in a relationship with the other nodes. The output layer 140 may include one or more nodes, for example, nodes $O_1$ through $O_n$, that do not have an output node in a relationship with the other nodes. The hidden layers 120 and 130 correspond to layers other than the input layer 110 and the output layer 140 in the DNN model 100, and include nodes $H_{11}$ through $H_{1m}$ and $H_{21}$ through $H_{2m}$ corresponding to input nodes or output nodes in a relationship with the other nodes. The DNN model 100 of FIG. 1 is an example for convenience of description, and the scope of examples should not be interpreted to be limited by a structure of the DNN model 100.

A DNN model used in examples may have various different structures. Based on various examples, the number of hidden layers included in a DNN model 100, the number of nodes included in each layer, and/or the connection relationship between nodes may be changed.

In an example, an output of one node included in a layer may be input to at least one node included in another layer. For example, an output of a node 112 included in the input layer 110 may be transferred to at least one node, for example, a node 122 of the hidden layer 120. Nodes are connected to each other by a "link", or weighted connection, and nodes connected by such links form relationships between an input node and an output node. The concepts of an input node and an output node are relative, and an arbitrary node in a relationship with the output node with respect to one node may be in a relationship with the input node in a relationship with another node, or vice versa.

In the DNN that includes a plurality of layers, a later layer of adjacent layers may receive a value obtained by multiplying a connection weighted by an output value of a relatively lower layer, or a previous layer by a connection weight, and applying a bias thereto, and outputs a certain operation or activation value, and the output value may be applied to another higher or subsequent layer adjacent to the layer in a similar manner, e.g., as an input.

Thus, the connection weight may be set for a link between nodes. A predetermined connection weight may be set for a link 115 between the nodes 112 and 122. There may be connection weighted links between nodes of the input layer and a hidden layer, each of the hidden layers, and between a hidden layer and the output layer. The connection weight may be adjusted or changed during training. DNN models with different connection weight values may exhibit different characteristics. A connection weight determines a degree of influence by associated data value on a final result by increasing, reducing or maintaining the data value. The connection weights are parameters of the DNN model 100.

In a relationship between an input node and an output node connected via such a link, an output value of the output node may be determined based on data input to the input node and a connection weight of the link between the input node and the output node. For example, when at least one input node is connected to one output node by each link, an output value of the output node may be determined based on an input value that is input to the at least one input node and a connection weight of a link between each of the at least one input node and the output node.

An output of an activation function associated with weighted inputs of a node included in a previous layer may be input to each of plural or all nodes included in a subsequent layer, e.g., hidden layer 130. The weighted inputs are obtained by multiplying a respective connection weight by an input of nodes included in a previous layer. The activation function includes, as non-limited examples, a sigmoid function, a hyperbolic tangent (tan h) function, or a rectified linear unit (ReLU) function. To each of nodes included in the output layer 140, weighted inputs of nodes included in a previous layer are input. A process of inputting weighed data from an arbitrary layer to a next layer is referred to as "propagation".

The above DNN model 100 may be implemented through computer-executable code or instructions that when executed by a hardware device, for example, a computer system, configure the hardware device to implement the neural network apparatus. The DNN model 100 includes, for example, a fully connected network, a deep convolutional network, or a recurrent neural network. The DNN model 110 is used in various fields, for example, an object recognition, a speech recognition, a pattern recognition or a computer vision.

To further enhance the performance of the DNN model 100, an ensemble scheme or approach may be used. The ensemble scheme is a scheme that acquires a plurality of outputs from a plurality of different DNN models, combines the plurality of acquired outputs, and determines a final result. An "ensemble" scheme may simply mean a fusing or a combining of a plurality of results or outputs. The ensemble scheme may enhance the performance of a final DNN model, but may need a large amount of time and resources to train various DNN models. Additionally, a large amount of resources (for example, a memory size) that may load or store a plurality of DNN models are used to implement the ensemble scheme. When the number of DNN models used to implement the ensemble scheme increases, a size of a memory to be used is increased. Since the DNN model may include a large number of parameters, a large memory may have to be used even for a single DNN model. An ensemble scheme of deriving a result may be derived by combining various neural networks generated by applying various machine learning algorithm approaches.

In an example, as another approach, similar to the approach of the ensemble scheme may be provided. The similar approach may use a single DNN model, and may acquire a plurality of pieces of output data by changing the single DNN model at different points in time, combining the plurality of pieces of output data, and determining final result data. By implementing the above process, an amount of resources to be used may be reduced, and the performance of the DNN model may be enhanced. Additionally, with regard to the training of the DNN model, a DNN model that is robust against an adversarial attack may be generated. The adversarial attack may indicate that an attacker deliberately manipulates an input value to cause a DNN model to produce an incorrect result. For example, an adversarial attack may correspond to an act that induces an incorrect classification result of the DNN model by synthesizing predetermined noise, that is difficult to be visually distinguished, with an input image, and by inputting the noise-synthesized input image into the DNN model. By training a DNN model based on training data containing noise, a DNN model robust against such an adversarial attack may be generated.

Figure 2:
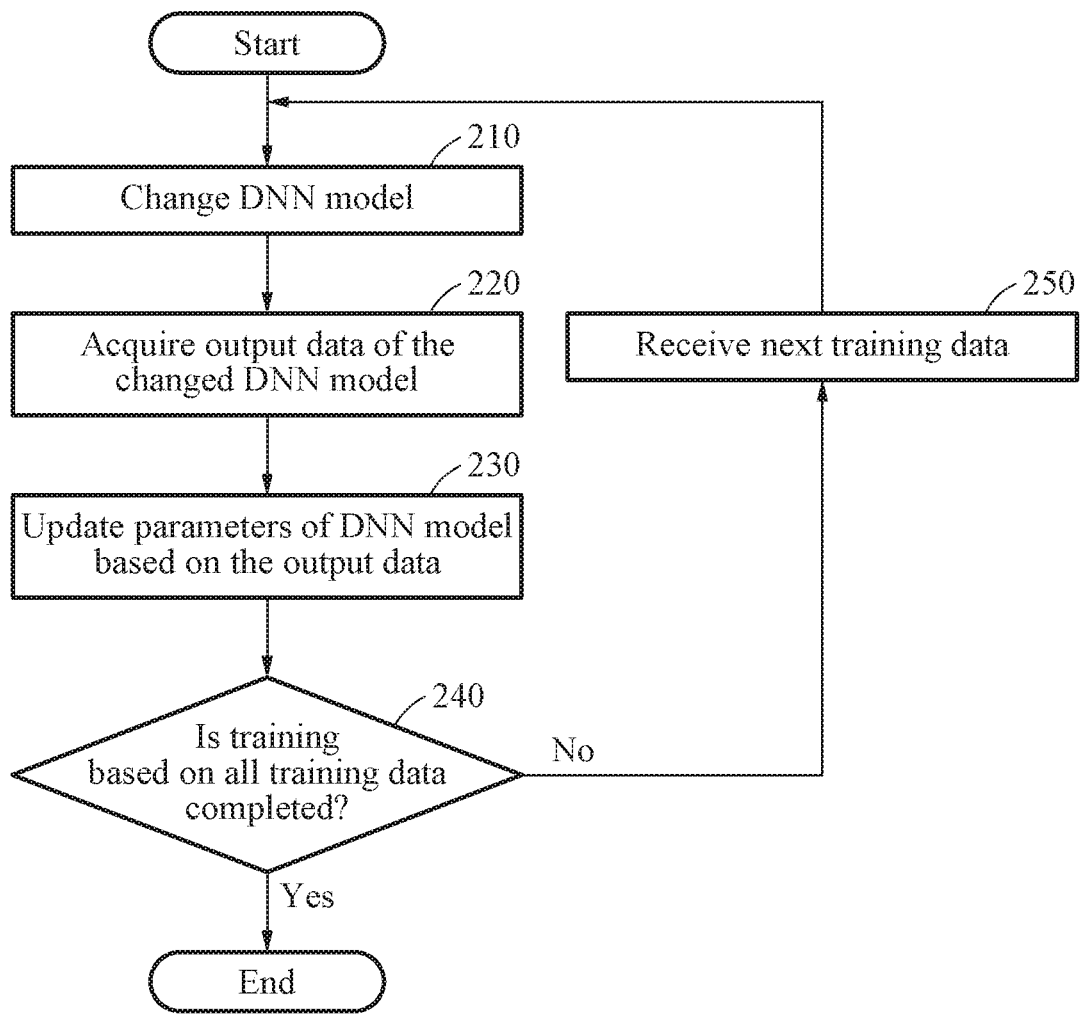
FIG. 2 is a flowchart illustrating an example training method of training a DNN model, in accordance with one or more embodiments.

FIG. 2 is a flowchart illustrating an example training method of training a DNN model, in accordance with one or more embodiments. The operations in FIG. 2 may be performed in the sequence and manner as shown, although the order of some operations may be changed or some of the operations omitted without departing from the spirit and scope of the illustrative examples described. One or more of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer or processor instructions. In addition to the description of FIG. 2 below, the descriptions of FIG. 1 are also applicable to FIG. 2, and are incorporated herein by reference. Thus, the above description may not be repeated here. The training method of FIG. 2 may be performed by, for example, a training apparatus.

Referring to FIG. 2, in operation 210, the training apparatus may change a DNN model. In an example, the changing of the DNN model may include changing at least one connection weight of the DNN model. The connection weights may be connection weights between layers and/or elements of a kernel filter(s). For example, the training apparatus may change a connection weight by determining a noise value using a noise model that has a shape of a Gaussian model and by applying the determined noise value to at least one connection weight of the DNN model. In this example, the noise value is a quantized noise value. A characteristic of a noise value to be output from the noise model may be determined based on a standard deviation value and an average applied to the noise model. Depending on examples, the training apparatus may determine a noise value to be applied to a connection weight of the DNN model using a quantization noise model that provides a quantized noise value.

In operation 220, the training apparatus acquires output data of the changed DNN model based on training data. The training apparatus may input the training data to the changed DNN model and acquire the output data from the changed DNN model. The changed DNN model may calculate output data based on a connection weight and a connection relationship between nodes based on the input training data, and output the output data.

In an example, during the training process, noise may be artificially added to the training data. In this example, the training apparatus may acquire output data of the DNN model by inputting the training data containing the noise to the changed DNN model. When the DNN model is trained based on training data containing noise, a DNN model that is robust against an adversarial attack may be acquired.

The training data may vary based on a manner in which the DNN model may be implemented. For example, when the DNN model is used for face recognition process examples, the training data may include a large and diverse number of face images. In another example, when the DNN model is used for speech recognition process examples, the training data may include a variety of speech data.

In operation 230, the training apparatus updates parameters of the DNN model based on the output data of the changed DNN model. For example, the training apparatus may perform a training process of updating parameters of the DNN model using a supervised machine learning scheme or an unsupervised machine learning scheme. The training process may include a process of calculating an error between the output data of the changed DNN model and target output data, and updating connection weights of the DNN model to reduce the calculated error, e.g., by back propagating that error back through the DNN. In a non-limiting example, a process of updating the connection weights may include adjusting the connection weights to minimize an objective function or a cost function described as a sum of differential function, for example, a stochastic gradient descent (SGD) that is called an incremental gradient descent.

In operation 240, the training apparatus determines whether training based on all training data is completed. If the training based on all the training data is not completed, the training apparatus receives next training data in operation 250. The training apparatus repeatedly performs a process of operations 210 through 240 on the next training data. As described above, the training apparatus trains the DNN model by repeatedly performing an operation of changing the DNN model, an operation of acquiring output data of the changed DNN model and an operation of updating parameters of the DNN model. When the training based on all the training data is completed, the training process of the DNN model is terminated.

Figure 3:
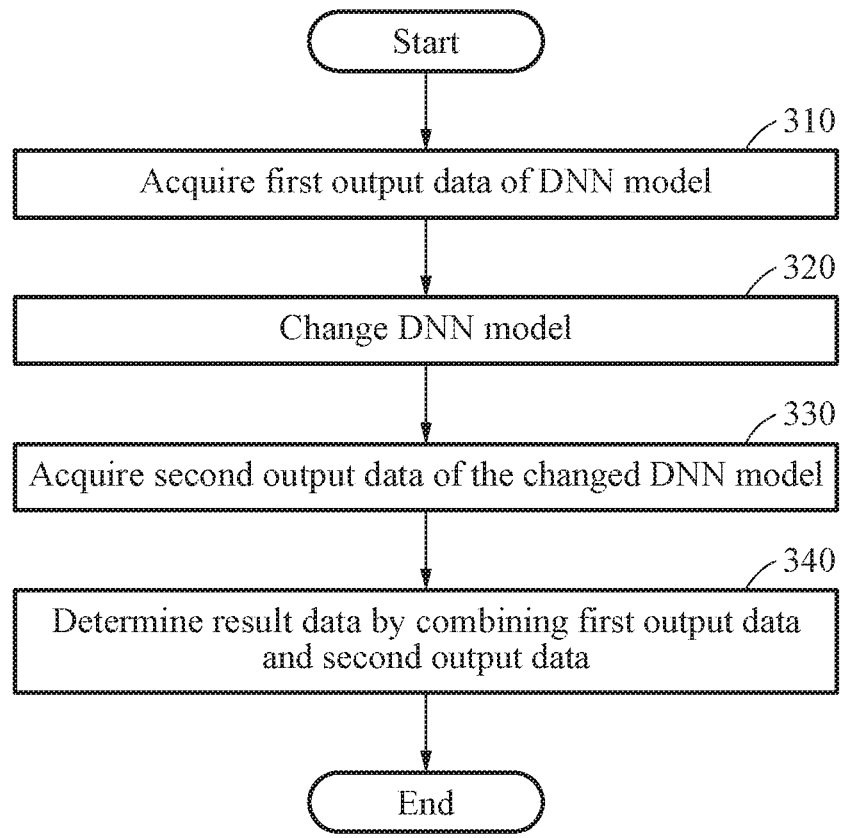
FIG. 3 is a flowchart illustrating an example data processing method using a DNN model, in accordance with one or more embodiments.

FIG. 3 is a flowchart illustrating an example of a data processing method using a DNN model, in accordance with one or more embodiments. The operations in FIG. 3 may be performed in the sequence and manner as shown, although the order of some operations may be changed or some of the operations omitted without departing from the spirit and scope of the illustrative examples described. One or more of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer or processor instructions. In addition to the description of FIG. 3 below, the descriptions of FIGS. 1-2 are also applicable to FIG. 3, and are incorporated herein by reference. Thus, the above description may not be repeated here. The data processing method of FIG. 3 is performed by, for example, a data processing apparatus.

Referring to FIG. 3, in operation 310, the data processing apparatus acquires first output data of a DNN model by inputting input data to the DNN model. In an example, when the DNN model to be used in facial authentication examples, image data as input data is input to the DNN model, and the DNN model outputs, as output data, a feature value or a probability value indicating a similarity between a user's face appearing in the image data, and a facial image of a registered user. In another example, when the DNN model is to be used in a liveness test example to determine whether an object is genuine or fake, image data representing an object to be tested is input as input data to the DNN model. In this example, the DNN model may output, as output data, a feature value or a score indicating an expected value that an object appearing in the image data corresponds to a living object.

In operation 320, the data processing apparatus changes the DNN model. The data processing apparatus changes the DNN model by changing parameters (for example, a connection weight of a link between nodes included in the DNN model) of the DNN model. The data processing apparatus changes a connection weight of at least one link, e.g., as between layers and/or as elements of a kernel filter(s). In an example, the data processing apparatus determines a noise value using a noise model, and applies the determined noise value to a connection weight of the DNN model, to change the connection weight. The data processing apparatus determines an arbitrary noise value using a noise model having a shape of a Gaussian model, and applies the determined noise value to at least one connection weight of the DNN model. The noise model having the shape of the Gaussian model is referred to as a "Gaussian noise model", and the Gaussian noise model may represent noise that follows a Gaussian distribution with an average of zero. In the Gaussian noise model, a characteristic of a noise value is determined based on a set average and standard deviation or variance.

A connection weight to which a noise value is to be applied may be randomly determined or may be defined in advance. However, the scope of the examples is not limited thereto. Depending on examples, a quantized noise value may be determined using a noise model, and the quantized noise value is applicable to at least one connection weight of the DNN model. Through the above change in the DNN model, a DNN model having a characteristic different from that of the DNN model used in operation 310 is generated.

In operation 330, the data processing apparatus acquires second output data from the changed DNN model. The data processing apparatus inputs input data to the changed DNN model to acquire the second output data from the changed DNN model. The input data is the same as the input data input to the DNN model in operation 310. Similar to operation 310, the data processing apparatus may acquire the second output data from the changed DNN model. The term "second output data" is used herein to be distinguished from the first output data of operation 310, and the second output data corresponds to output data of the changed DNN model.

In operation 340, the data processing apparatus determines result data by combining or fusing the first output data and the second output data. In an example, the data processing apparatus combines or fuses the first output data and the second output data and determines final result data, similarly to an ensemble scheme. For example, when the first output data and the second output data are assumed to be a first feature value and a second feature value, respectively, the data processing apparatus may determine a sum, a weighted sum or an average of the first feature value and the second feature value to be result data.

Although an example of determining result data based on two pieces of output data has been described above, examples include the data processing method being equally implemented in examples in which a DNN model is changed at least two or more times, output data is acquired every time the DNN model is changed, and the acquired output data may be combined to determine final result data. In an example, when the second output data is acquired in operation 330, the DNN model may be changed again in operation 320 to generate a changed DNN model with a different characteristic, and input data may be input to the changed DNN model to acquire third output data. In this example, the data processing apparatus may combine the first output data, the second output data, and the third output data to determine final result data.

As described above, the typical data processing apparatus may provide an effect similar to that of the ensemble scheme by using a single DNN model and changing the DNN model, and then acquiring a variety of output data using the changed DNN model. The DNN model may use powerful computing resources and extensive data storage resources, and a typical ensemble scheme that implements a plurality of DNN models may utilize a significantly large amount of resources.

However, as an example, the example data processing method may be implemented using a single DNN model, and thus less resources may be needed, and an accuracy of the DNN model may be enhanced based on the ensemble scheme. Thus, the data processing method may be effectively used to enhance the performance of the DNN model in a resource constrained usage environment. Also, a DNN model may be trained to more accurately identify artificially input noise in a training process, e.g., similarly to the training process of FIG. 2, and thus a processing result that is robust against an adversarial attack may be obtained.

Figure 4:
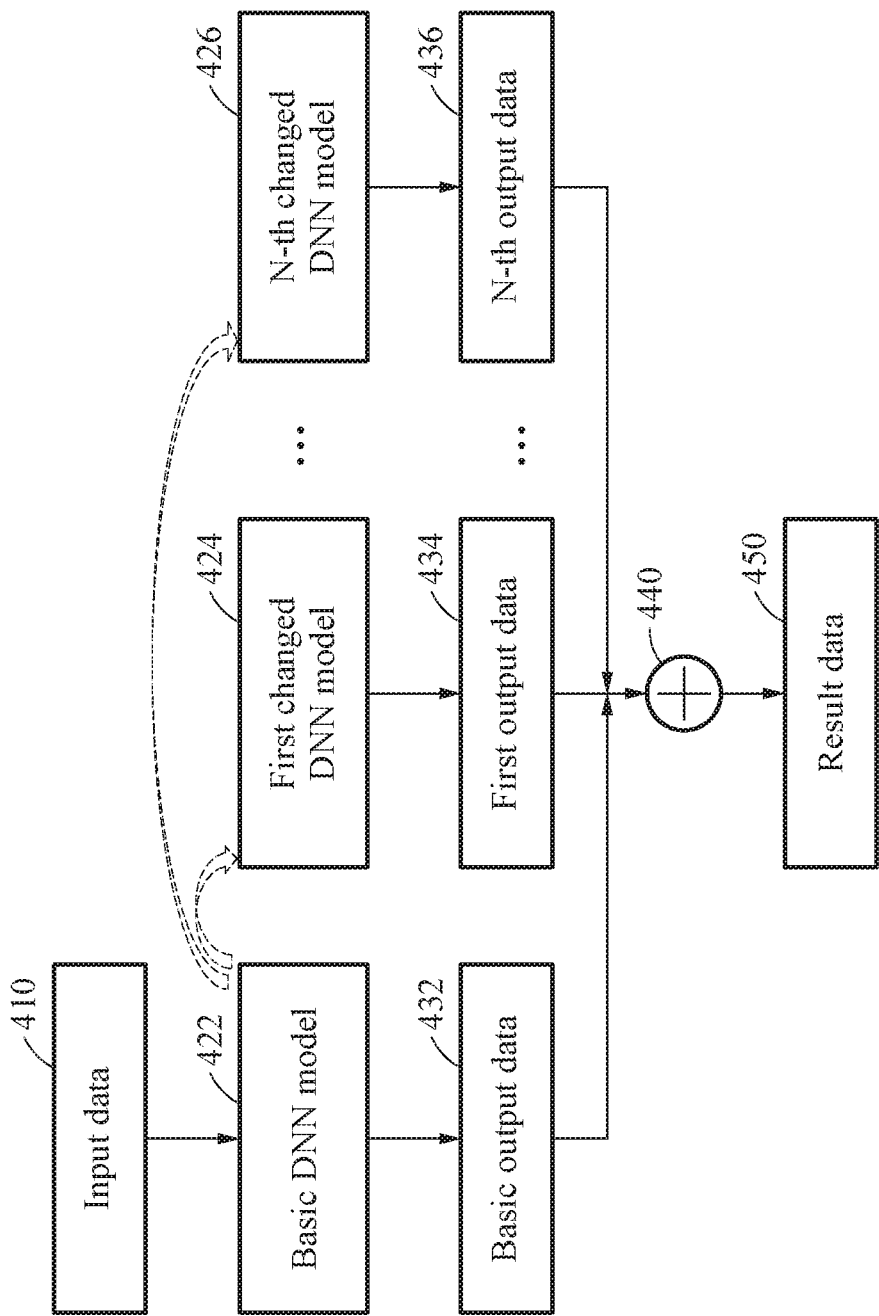
FIG. 4 illustrates an example data processing process using a DNN model, in accordance with one or more embodiments.

FIG. 4 illustrates an example data processing process using a DNN model, in accordance with one or more embodiments.

Referring to FIG. 4, input data 410 to be processed is transferred to a DNN model. In a first phase, the input data 410 is input to a basic DNN model 422, and the basic DNN model 422 outputs basic output data 432. The basic DNN model 422 is a DNN model, and corresponds to a DNN model that is not changed.

In a second phase, a first changed DNN model 424 is generated by changing the basic DNN model 422. The first changed DNN model 424 may be generated by changing parameters of the basic DNN model 422. In an example, the first changed DNN model 424 may be acquired by applying a quantized noise value to a connection weight of the basic DNN model 422. The input data 410 is then input to the first changed DNN model 424, and the first changed DNN model 424 outputs first output data 434.

In an N-th phase, an N-th changed DNN model 426 is generated by changing the basic DNN model 422. Similarly, the input data 410 is input to the N-th changed DNN model 426, and N-th output data 436 is acquired from the N-th changed DNN model 426. In this example, N is a natural number greater than, or equal to, 2. Although an example of changing the basic DNN model 422 N times has been described above, the basic DNN model 422 may be changed once.

The basic output data 432, the first output data 434 and the N-th output data 436 are combined or fused in operation 440 and final result data 450 is determined. As described above, an ensemble scheme may be implemented using a single basic DNN model, for example, the basic DNN model 422, and thus it is possible to reduce an amount of resources to be used to implement the ensemble scheme.

Figure 5:
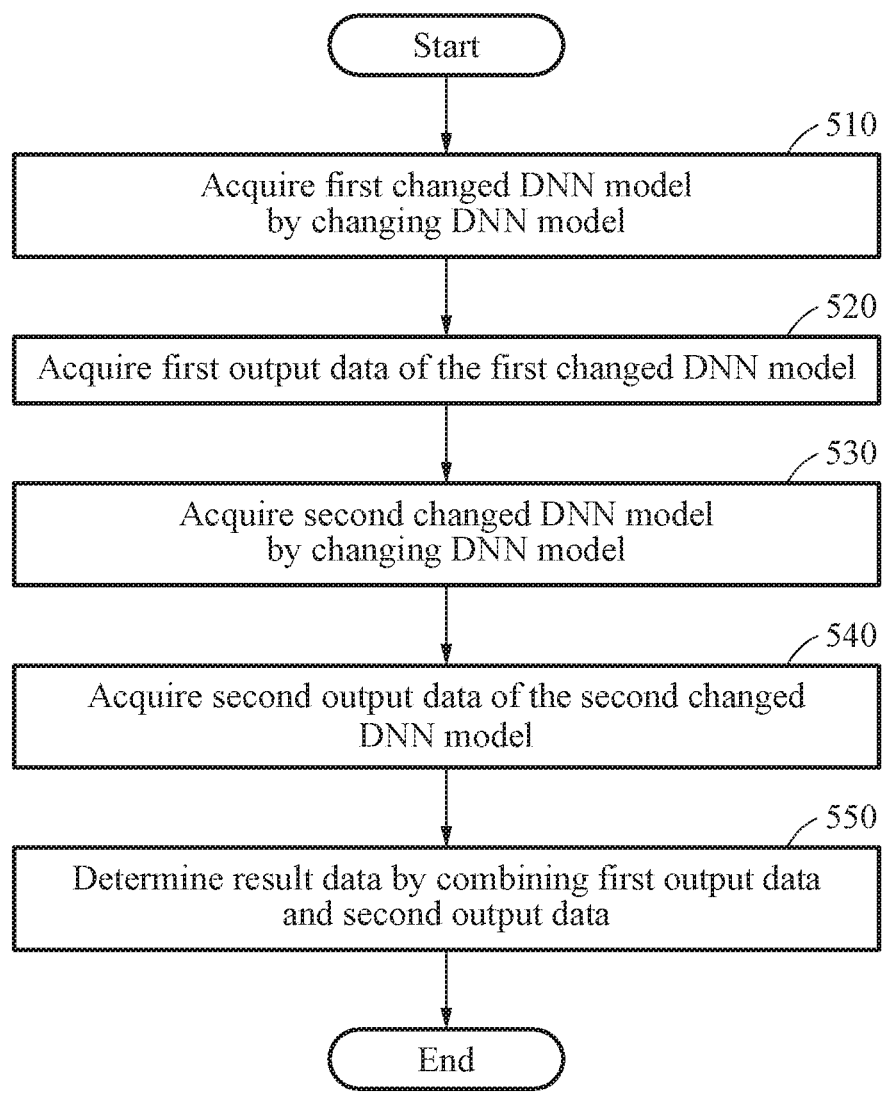
FIG. 5 is a flowchart illustrating an example data processing method using a DNN model, in accordance with one or more embodiments.

FIG. 5 is a flowchart illustrating an example of a data processing method using a DNN model, in accordance with one or more embodiments. The operations in FIG. 5 may be performed in the sequence and manner as shown, although the order of some operations may be changed or some of the operations omitted without departing from the spirit and scope of the illustrative examples described. One or more of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer or processor instructions. In addition to the description of FIG. 5 below, the descriptions of FIGS. 1-4 are also applicable to FIG. 5, and are incorporated herein by reference. Thus, the above description may not be repeated here. The data processing method of FIG. 5 is performed by, for example, the data processing apparatus.

Referring to FIG. 5, in operation 510, the data processing apparatus acquires a first changed DNN model by changing a DNN model, for example, a provided basic DNN model. The data processing apparatus generates the first changed DNN model by applying a quantized noise value to at least one connection weight of the basic DNN model.

In operation 520, the data processing apparatus acquires first output data of the first changed DNN model by inputting input data to the first changed DNN model.

In operation 530, the data processing apparatus acquires a second changed DNN model by changing a DNN model, for example, a basic DNN model. Similar to operation 510, the data processing apparatus generates the second changed DNN model by applying a quantized noise value to at least one connection weight of the basic DNN model. The first changed DNN model of operation 510 may be different from the second changed DNN model of operation 530, because noise values applied to the connection weight of the basic DNN model and noise values applied to the first changed DNN model may be different from each other, or connection weights to which noise values are applied are different from each other.

In operation 540, the data processing apparatus acquires second output data of the second changed DNN model by inputting input data to the second changed DNN model. The input data may be the same as the input data input to the first changed DNN model in operation 520.

In operation 550, the data processing apparatus determines final result data by combining or fusing the first output data and the second output data.

Although an example of determining result data based on two pieces of output data has been described above, examples include the data processing method examples in which a DNN model is changed three or more times, output data is acquired every time the DNN model is changed and the acquired output data is combined to determine result data.

Figure 6:
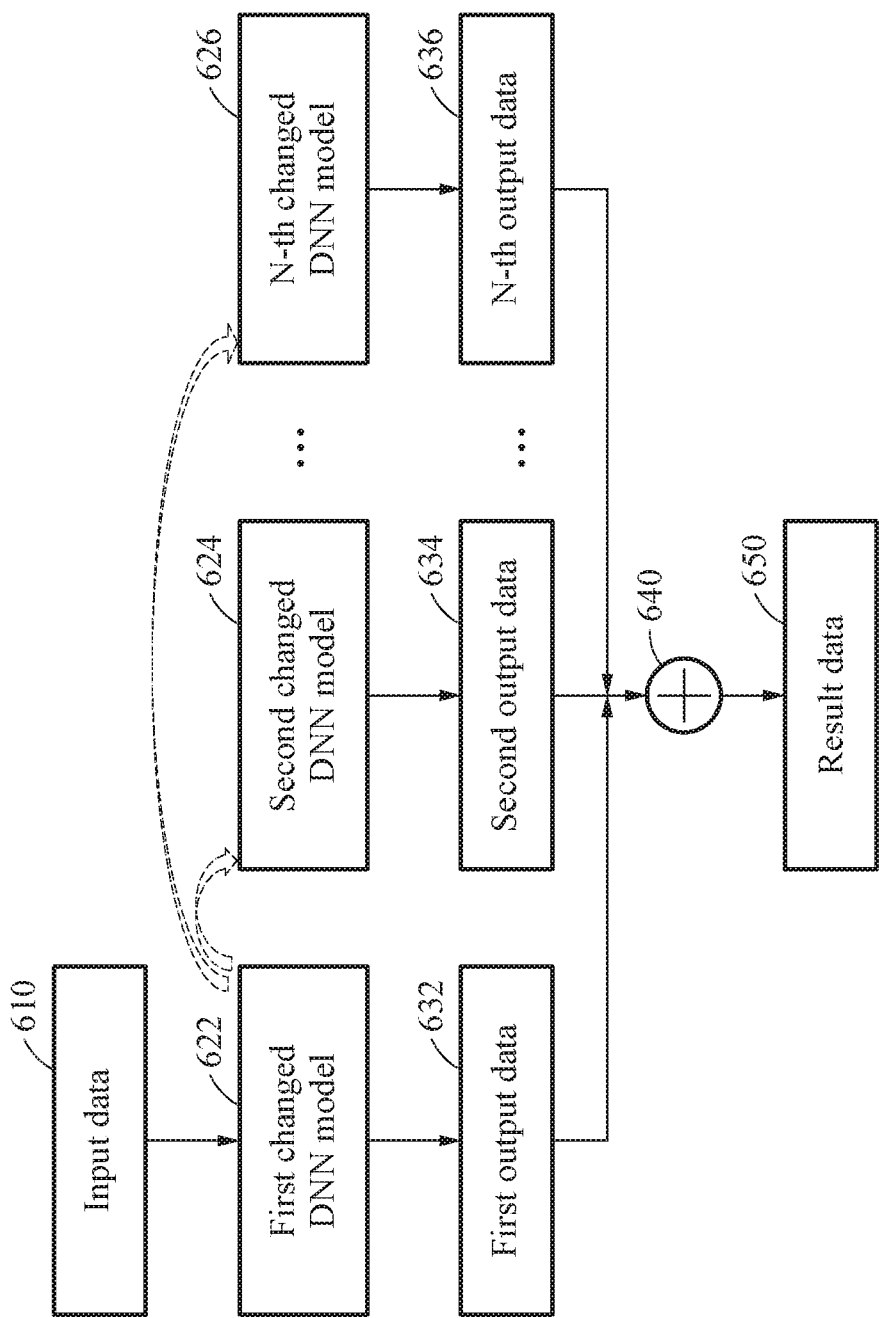
FIG. 6 illustrates an example data processing process using a DNN model, in accordance with one or more embodiments.

FIG. 6 illustrates another example of a data processing process using a DNN model, in accordance with one or more embodiments.

In the examples of FIG. 6, a changed DNN model may be used as the initial DNN model. Referring to FIG. 6, input data 610 to be processed is transferred to a first changed DNN model 622. In a first phase, a first changed DNN model 622 is generated by changing a basic DNN model. For example, the first changed DNN model 622 is generated by applying a quantized noise value to at least one connection weight of the basic DNN model. The input data 610 is input to the first changed DNN model 622, and the first changed DNN model 622 outputs first output data 632.

In a second phase, a second changed DNN model 624 is generated by changing the basic DNN model. Similar to the generation of the first changed DNN model 622, the second changed DNN model 624 is generated by applying a quantized noise value to at least one connection weight of the basic DNN model. However, the noise value applied to the first changed DNN model 622 is different from the noise value applied to the second changed DNN model 624, or connection weights to which the noise values are applied are different from each other. The input data 610 is input to the second changed DNN model 624, and the second changed DNN model 624 outputs second output data 634.

In an N-th phase, an N-th changed DNN model 626 is generated by changing the basic DNN model. Similarly, the input data 610 is input to the N-th changed DNN model 626, and N-th output data 636 is acquired from the N-th changed DNN model 626. In this example, N is a natural number greater than or equal to 3.

The first output data 632, the second output data 634 and the N-th output data 636 are combined or fused in operation 640 and result data 650 is determined.

Figure 7:
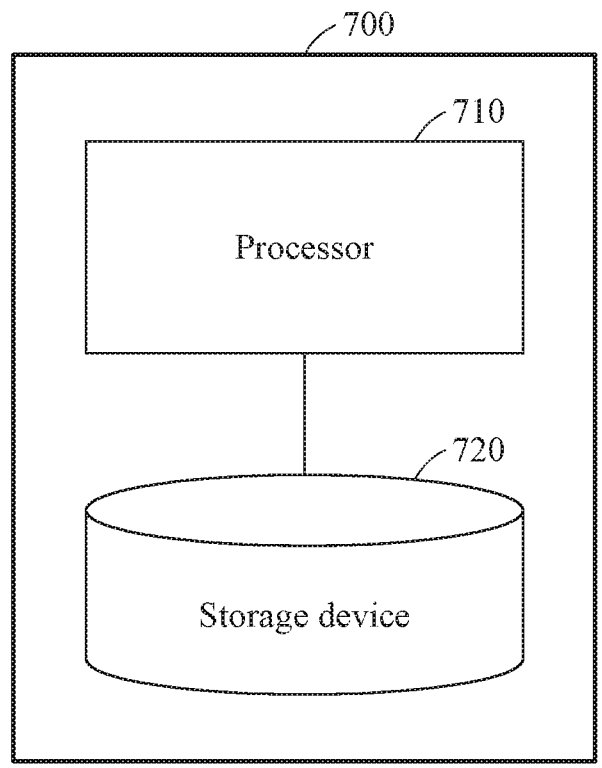
FIG. 7 is a block diagram illustrating an example training apparatus, in accordance with one or more embodiments.

FIG. 7 is a block diagram illustrating an example training apparatus 700, in accordance with one or more embodiments.

Referring to FIG. 7, the training apparatus 700 may include a processor 710 and a storage device 720. In an example, the training apparatus 700 may further store instructions, e.g., in memory 720, which when executed by the processor 710 configure the processor 710 to implement one or more or any combination of operations herein. The processor 710 and the memory 720 may be respectively representative of one or more processors 710 and one or more memories 720.

The training apparatus 700 may correspond to a computing device. For example, the training apparatus 700 may be, as non-limiting examples, a personal computer (PC), a server, a mobile device, and the like, and may further correspond to, or be an apparatus provided in, autonomous vehicles, robotics, smartphones, tablet devices, augmented reality (AR) devices, Internet of Things (IoT) devices, and similar devices, which perform voice recognition and image recognition by implementing a neural network, but the present disclosure is not limited thereto, and may correspond to various other types of devices.

The storage device 720 stores data or information used for a processing operation of the training apparatus 700. For example, the storage device 720 may store training data used to train a DNN model. Also, the storage device 720 may store instructions to be executed by the processor 710. The storage device 720 includes a non-transitory computer-readable storage medium, for example, a random access memory (RAM), a dynamic RAM (DRAM), a static RAM (SRAM), a magnetic hard disk, an optical disk, a flash memory, an electrically programmable read-only memory (EPROM), or other types of non-transitory computer-readable storage media known in the art.

The processor 710 controls overall operations of the training apparatus 700, and performs functions and/or executes instructions in the training apparatus 700. The processor 710 performs a training process of training a DNN model based on training data, and at least one of the operations described above with reference to FIG. 2, for example, in association with the training process. The processor 710 is a hardware configuration for performing general control functions to control operations of the training apparatus 700. For example, the processor 710 may generally control the training apparatus 700 by executing instructions stored in the memory 720 of the neural network apparatus 700. The processor 710 may be implemented by, as non-limiting examples, a central processing unit (CPU), a graphics processing unit (GPU), an application processor (AP), a neural processing unit (NPU), and the like, which are provided in the neural network g apparatus 100.

The processor 710 may change a DNN model by applying a noise value to at least one connection weight of the DNN model, and perform the training process based on the changed DNN model and training data. The processor 710 may acquire output data of the changed DNN model by inputting the training data to the changed DNN model, and update parameters of the DNN model based on the output data. The training apparatus 700 may train the DNN model by repeatedly performing an operation of changing the DNN model, an operation of acquiring output data of the changed DNN model and an operation of updating parameters of the DNN model based on the output data. Depending on examples, the processor 710 may generate training data containing noise by applying the noise to the training data, and may also perform the above training process of the DNN model based on the training data containing the noise.

Figure 8:
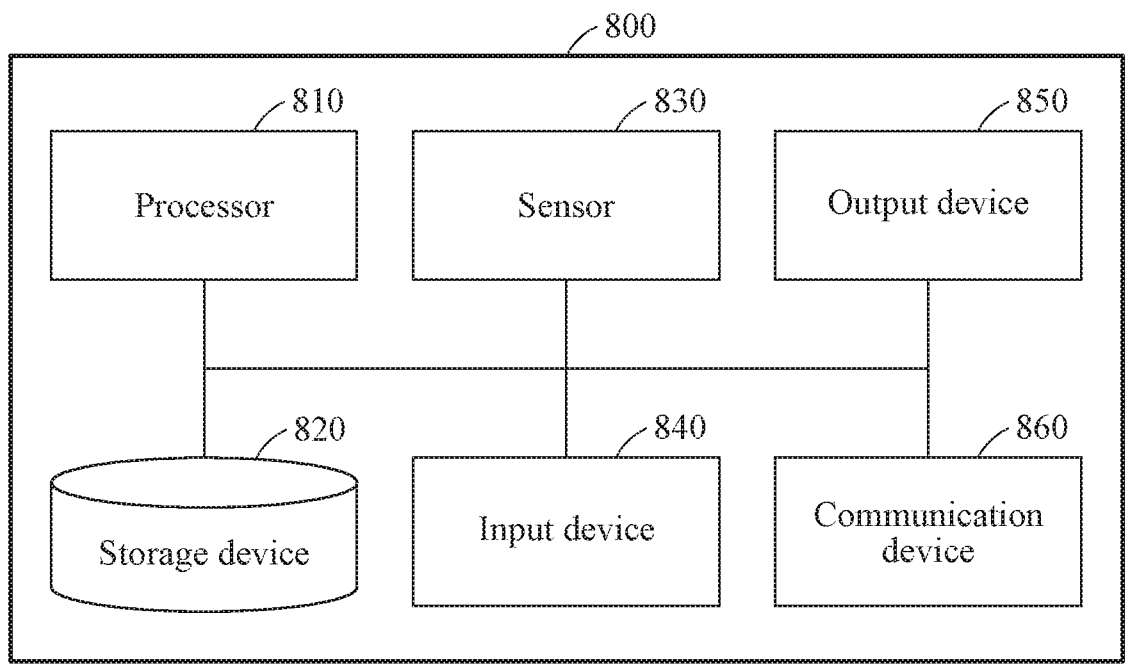
FIG. 8 is a block diagram illustrating an example data processing apparatus, in accordance with one or more embodiments.

FIG. 8 is a block diagram illustrating an example data processing apparatus 800, in accordance with one or more embodiments.

Referring to FIG. 8, the data processing apparatus 800 may include a processor 810 and a storage device 820. Depending on examples, the data processing apparatus 800 may further include any one or any combination of a sensor 830, an input device 840, an output device 850 and a communication device 860. As discussed herein, references to "a processor" may correspond to one or more processors, and references to "a memory" may correspond to one or more memories.

The data processing apparatus 800 may correspond to a computing device. For example, the training apparatus 800 may be, as non-limiting examples, a personal computer (PC), a server, a mobile device, and the like, and may further correspond to, or be an apparatus provided in, autonomous vehicles, robotics, smartphones, tablet devices, augmented reality (AR) devices, Internet of Things (IoT) devices, and similar devices, which perform voice recognition and image recognition by implementing a neural network, but the present disclosure is not limited thereto, and may correspond to various other types of devices.

The storage device 820 may store data or information used for a processing operation of the data processing apparatus 800. For example, the data storage device 820 may store input data for the purpose of data processing. Also, the storage device 820 may store instructions to be executed by the processor 810. The storage device 820 may include at least one of volatile memory or nonvolatile memory. The nonvolatile memory may include read only memory (ROM), programmable ROM (PROM), electrically programmable ROM (EPROM), electrically erasable and programmable ROM (EEPROM), flash memory, phase-change RAM (PRAM), magnetic RAM (M RAM), resistive RAM (RRAM), ferroelectric RAM (FRAM), and the like. The volatile memory may include dynamic RAM (DRAM), static RAM (SRAM), synchronous DRAM (SDRAM), phase-change RAM (PRAM), magnetic RAM (MRAM), resistive RAM (RRAM), ferroelectric RAM (FeRAM), and the like. Furthermore, the storage device 820 may include at least one of hard disk drives (HDDs), solid state drive (SSDs), compact flash (CF) cards, secure digital (SD) cards, micro secure digital (Micro-SD) cards, mini secure digital (Mini-SD) cards, extreme digital (xD) cards, or Memory Sticks.

The processor 810 may control overall operations of the data processing apparatus 800, and implement functions and/or instructions to operate in the data processing apparatus 800. In an example, the data processing apparatus 800 may include at least one processor 810, and the processor 810 may include, for example, a graphics processing unit (GPU) and/or a central processing unit (CPU) of a computing apparatus. The processor 810 performs a process of processing input data using a DNN model, and at least one of the operations described above with reference to FIGS. 3 through 6, for example, in association with the process.

In an example, the processor 810 may acquire first output data of the DNN model by inputting input data to the DNN model. The processor 810 may change the DNN model to generate the changed DNN model. For example, the processor 810 may determine a noise value using a noise model and may apply the determined noise value to at least one connection weight of the DNN model, to change the at least one connection weight of the DNN model. Through the above process, a DNN model with a changed characteristic may be generated. The processor 810 may acquire second output data of the changed DNN model by inputting the input data to the changed DNN model, and determine result data by combining the first output data and the second output data.

In another example, the processor 810 may acquire a first changed DNN model by changing the DNN model. For example, the processor 810 may generate the first changed DNN model by applying a noise value to at least one connection weight of the DNN model. The processor 810 may acquire first output data of the first changed DNN model by inputting input data to the first changed DNN model. Similarly, the processor 810 may generate a second changed DNN model by changing the at least one connection weight of the DNN model based on a noise value. The second changed DNN model may be different from the first changed DNN model. The processor 810 may acquire second output data of the second changed DNN model by inputting the input data to the second changed DNN model, and determines result data by combining the first output data and the second output data.

In a non-limiting example, the sensor 830 may include at least one sensor. The sensor 830 may include, as non-limiting examples, an image sensor, a speech sensor, a radar sensor or a measurement sensor. In an example, image data, speech data or radar data acquired by the sensor 830 may be used as the input data that has been described above.

The input device 840 receives a user input from a user. The input device 840 detects an input from, as non-limiting examples, a keyboard, a mouse, a touchscreen, or a microphone of the user, and includes any other device configured to transfer the detected input.

The output device 850 may provide a user with an output of the data processing apparatus 800 using, as non-limiting examples, a visual scheme, an auditory scheme, or a tactile scheme. For example, the output device 850 may include, as non-limiting examples, a display device, a speaker device, a lighting device, a haptic device, or any other device configured to provide the user with the output.

The communication device 860 may communicate with an external device via a wired or wireless network. For example, the communication device 860 may communicate with the external device using a wired communication scheme, or a wireless communication scheme, for example, a Bluetooth communication, a wireless fidelity (Wi-Fi) communication, a third generation (3G) communication or a long-term evolution (LTE) communication.

The neural network apparatuses, training apparatus 700, corresponding processors and memories, processor 710, storage device 720, processor 810, sensor 830, output device 850, storage device 820, input device 840, communication device 860, and other devices, and other components described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIM D) multiprocessing, multiple-instruction single-data (MISD) multiprocessing, and multiple-instruction multiple-data (MIMD) multiprocessing.

The methods that perform the operations described in this application, and illustrated in FIGS. 1-8, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method comprising:
   implementing a deep neural network (DNN) model using input data;
   generating, by implementing the DNN model, first output data from the DNN model;
   changing the DNN model;
   generating, by implementing the changed DNN model using the input data, second output data of the changed DNN model; and
   determining result data by combining the first output data and the second output data.

2. The method of claim 1, wherein the input data is inference input data.

3. The method of claim 2, wherein the changing of the DNN model comprises changing at least one connection weight of the DNN model.

4. The method of claim 2, wherein the changing of the DNN model comprises:
   determining a noise value based on a noise model; and
   applying the determined noise value to at least one connection weight of the DNN model.

5. The method of claim 4, wherein the determining of the noise value comprises determining the noise value a Gaussian model.

6. The method of claim 4, wherein the noise value is a quantized noise value.

7. The method of claim 2, wherein the DNN model is a single DNN model.

8. The method of claim 2, wherein the DNN model is one of a face authentication model, a liveness model, a translation model, and an objection recognition model, and an object detection model.

9. A non-transitory computer-readable storage medium storing instructions that, when executed by a processor, cause the processor to perform the method of claim 1.

10. A processor-implemented data processing method comprising:
    generating a first changed deep neural network (DNN) model by changing a trained initial DNN model;
    generating first output data from the first changed DNN model by implementing the first changed DNN model using input data;
    generating a second changed DNN model by changing the initial DNN model;
    generating second output data from the second changed DNN model by implementing the second changes DNN model using the input data; and
    determining result data by combining the first output data and the second output data.

11. The method of claim 10, wherein
    the generating of the first changed DNN model comprises changing at least one connection weight of the initial DNN model,
    the generating of the second changed DNN model comprises changing at least one connection weight of the initial DNN model, and
    the first changed DNN model is different from the second changed DNN model.

12. The method of claim 10, further comprising determining the result data based on an output of the initial DNN model.

13. A processor-implemented training method comprising:
    changing a deep neural network (DNN) model;
    implementing the changed DNN model using trained input data;
    generating, by implementing the changed DNN model, output data from the changed DNN model;
    updating parameters of the DNN model based on the generated output data; and
    training the DNN model by repeatedly performing the changing, the generating, and the updating.

14. The method of claim 13, wherein the changing of the DNN model comprises changing at least one connection weight of the DNN model.

15. The method of claim 13, wherein the changing of the DNN model comprises:
    determining a noise value based on a noise model; and
    applying the determined noise value to at least one connection weight of the DNN model.

16. The method of claim 15, wherein the noise value is a quantized noise value.

17. The method of claim 13, wherein the generating of the output data comprises generating the output data by inputting training data containing noise to the changed DNN model.

18. An apparatus comprising
    one or more processors configured to:
       implement a deep neural network (DNN) model using input data;
       generate, by implementing the DNN model, first output data of the DNN model;
       change the DNN model;

generate, by implementing the changed DNN model using the input data, second output data from the changed DNN model; and determine result data by combining the first output data and the second output data.

19. The apparatus of claim 18, wherein the processor is further configured to change at least one connection weight of the DNN model.

20. The apparatus of claim 19, wherein the processor is further configured to determine a noise value based on a noise model and apply the determined noise value to the at least one connection weight of the DNN model, to change the at least one connection weight of the DNN model.

21. The apparatus of claim 18, further comprising a memory storing instructions that, when executed by the one or more processors, configure the one or more processors to perform the generating of the first output data, the changing of the DNN model, the generating of the second output data, and the determining of the result data.

22. The apparatus of claim 18, further comprising an image capture device configured to capture the input data.

23. An apparatus comprising
one or more processors configured to:
generate a first changed deep neural network (DNN) model by changing a trained initial DNN model;
generate first output data of the first changed DNN model by implementing the first changed DNN model using input data;
generate a second changed DNN model by changing the initial DNN model;
generate second output data from the second changed DNN model by implementing the second changes DNN model using the input data; and
determine result data by combining the first output data and the second output data.

24. The apparatus of claim 23, wherein
the processor is further configured to:
generate the first changed DNN model by changing at least one connection weight of the DNN model; and
generate the second changed DNN model by changing at least one connection weight of the DNN model, and
wherein the first changed DNN model is different from the second changed DNN model.

* * * * *